US011257205B2

United States Patent
Cho et al.

(10) Patent No.: US 11,257,205 B2
(45) Date of Patent: Feb. 22, 2022

(54) IMAGE MEASURING METHOD AND APPARATUS

(71) Applicant: MITUTOYO CORPORATION, Kanagawa (JP)

(72) Inventors: Gyokubu Cho, Kanagawa (JP); Koichi Komatsu, Kawasaki (JP); Akira Takada, Yokohama (JP); Hiroyuki Yoshida, Kawasaki (JP); Takashi Hanamura, Kawasaki (JP); Takuho Maeda, Kawasaki (JP); Makoto Kaieda, Miyazaki (JP); Isao Tokuhara, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 15/384,713

(22) Filed: Dec. 20, 2016

(65) Prior Publication Data

US 2017/0178315 A1    Jun. 22, 2017

(30) Foreign Application Priority Data

Dec. 21, 2015    (JP) .............................. JP2015-249045

(51) Int. Cl.
*G01B 11/02* (2006.01)
*G01B 11/08* (2006.01)
(Continued)

(52) U.S. Cl.
CPC ............ *G06T 7/0006* (2013.01); *G01B 11/02* (2013.01); *G01B 11/08* (2013.01); *G06T 7/001* (2013.01);
(Continued)

(58) Field of Classification Search
CPC ....... G01B 11/02; G01B 11/08; G06T 7/0006; G06T 7/001; G06T 7/62; G06T 2200/24; G06T 2207/30164
See application file for complete search history.

(56) References Cited

U.S. PATENT DOCUMENTS 3,858,983 A * 1/1975 Foster .................. G01B 11/022
356/390
5,495,677 A * 3/1996 Tachikake ................ G01B 3/18
33/784
(Continued)

FOREIGN PATENT DOCUMENTS

| DE | 4039743 A1 * | 6/1992 | ............ G01B 11/08 |
| JP | 08015176 A * | 1/1996 | |
| JP | 2010169439 A * | 8/2010 | |

OTHER PUBLICATIONS

*Internet Patents Corporation (IPC) v. Active Network, Inc* (Decided Jun. 23, 2015) (Year: 2015).*

(Continued)

*Primary Examiner* — Yubin Hung
(74) *Attorney, Agent, or Firm* — Greenblum & Bernstein, P.L.C.

(57) ABSTRACT

An image measuring method performed with an image measuring device measuring a dimension of a measured object from an image of the measured object captured by an image capturer. The method executes a standard reference object measurement measuring a dimension of the standard reference object with the image measuring device; a standard reference dimension input inputting a dimension of the standard reference object specified by a device other than the image measuring device; a preset value calculation calculating a preset value from the dimension of the measured standard reference object and from a dimension of the standard reference object measured by a predetermined (Continued)

measurement tool; a measurement measuring a dimension of a measured object other than the standard reference object using the image measuring device; and a correction correcting the dimension of the measured object other than the standard reference object measured by the image measuring device.

30 Claims, 14 Drawing Sheets

(51) Int. Cl.
*G06T 7/00* (2017.01)
*G06T 7/62* (2017.01)
(52) U.S. Cl.
CPC ............ *G06T 7/62* (2017.01); *G06T 2200/24* (2013.01); *G06T 2207/30164* (2013.01)

(56) References Cited

U.S. PATENT DOCUMENTS

| | | | | |
|---|---|---|---|---|
| 5,699,282 A * | 12/1997 | Allen | ............... | G01R 31/2818 324/699 |
| 5,959,866 A * | 9/1999 | Hanaoka | ............ | G05B 19/4015 369/30.33 |
| 6,055,329 A * | 4/2000 | Mufti | ....................... | G01B 9/08 250/559.12 |
| 6,682,403 B1 * | 1/2004 | Laycock | .................. | B24B 1/00 451/119 |
| 7,685,026 B1 * | 3/2010 | McGrady | ................ | G07F 11/64 705/28 |
| 9,420,160 B2 | 8/2016 | Yoshida | | |
| 2003/0097315 A1 * | 5/2003 | Guerrero | ............. | G06Q 10/087 705/28 |
| 2004/0023482 A1 * | 2/2004 | Dell'Ova | ............... | H01L 22/14 438/617 |
| 2005/0195157 A1 * | 9/2005 | Kramer | ............... | G06F 3/04845 345/156 |
| 2006/0091309 A1 * | 5/2006 | Oosaki | .................. | H01J 37/222 250/310 |
| 2006/0221351 A1 * | 10/2006 | Yu | ........................ | H04N 5/2251 356/615 |
| 2007/0112535 A1 * | 5/2007 | Bryll | .................. | G01B 11/0608 702/86 |
| 2007/0156366 A1 * | 7/2007 | Johnson | .................... | G06F 8/71 702/123 |
| 2007/0229848 A1 * | 10/2007 | Yamamoto | ......... | G01M 11/0264 356/515 |
| 2007/0285743 A1 * | 12/2007 | Hirayama | ............ | H04N 1/6033 358/504 |
| 2009/0105598 A1 * | 4/2009 | Williams | ........... | A61B 5/02156 600/486 |
| 2009/0242760 A1 * | 10/2009 | Miyamoto | ............. | G01B 15/00 250/307 |
| 2012/0081442 A1 * | 4/2012 | Ikeda | ..................... | B41J 2/2146 347/15 |
| 2012/0194673 A1 * | 8/2012 | Kawa | ....................... | G01B 9/04 348/142 |
| 2013/0187905 A1 * | 7/2013 | Vaddadi | ................ | G06T 15/205 345/419 |
| 2014/0043610 A1 * | 2/2014 | Engel | ..................... | G01B 11/14 356/369 |
| 2014/0152794 A1 * | 6/2014 | Takahashi | ................ | G01B 9/04 348/79 |
| 2014/0157861 A1 * | 6/2014 | Jonas | ..................... | G01B 5/008 73/1.79 |
| 2015/0060654 A1 * | 3/2015 | Urano | ................... | H01J 37/153 250/252.1 |
| 2015/0241683 A1 * | 8/2015 | Oba | ..................... | G01B 11/022 348/79 |
| 2015/0287177 A1 | 10/2015 | Kaieda et al. | | |
| 2016/0018976 A1 | 1/2016 | Kaieda | | |
| 2016/0019687 A1 | 1/2016 | Cho et al. | | |
| 2016/0021306 A1 | 1/2016 | Cho et al. | | |
| 2016/0093068 A1 | 3/2016 | Sugai et al. | | |
| 2016/0131474 A1 | 5/2016 | Saeki et al. | | |
| 2016/0146594 A1 | 5/2016 | Nishio et al. | | |
| 2016/0295207 A1 * | 10/2016 | Yoshida | ............... | G01B 11/022 |

OTHER PUBLICATIONS

Irianto ("In-process inspection and correction facilities subject to errors," Proceedings of 1994 IEEE International Engineering Management Conference; Date of Conference: Oct. 17-19, 1994) (Year: 1994).*
Chen et al. ("Shape averaging and its applications to industrial design," IEEE Computer Graphics and Applications, vol. 9, Issue: 1; Jan. 1989) (Year: 1989).*
"2-D Color Vision Measuring System, Quick Image Series", Mitutoyo Corporation (Catalog No. E14009), Nov. 2015.
U.S. Appl. No. 15/423,941 to Hiroyuki Yoshida, which was filed on Feb. 3, 2017.

* cited by examiner

RELATED ART

RELATED ART

IMAGE MEASURING METHOD AND APPARATUS

CROSS-REFERENCE TO RELATED APPLICATIONS

The present application claims priority under 35 U.S.C. § 119 of Japanese Application No. 2015-249045, filed on Dec. 21, 2015, the disclosure of which is expressly incorporated by reference herein in its entirety.

BACKGROUND OF THE INVENTION

1. Field of the Invention

The present invention relates to an image measuring method and image measuring device obtaining highly accurate measurement results in image measurement.

2. Description of Related Art

An image measuring device (see, for example, MITU-TOYO Corporation, "2-D Color Vision Measuring System; QUICK IMAGE Series") measuring dimensions of a measured object (referred to as a "work piece" hereafter) may, as shown in FIG. 13, emit light from various illumination light sources at a work piece W placed on a stage 10, enlarge the illuminated work piece W with a group of lenses 31, and perform image capture with an image capturer (imaging element) 40 such as a CCD camera, for example. At this point, commonly used light sources are epi-illumination 32 emitted from above the work piece W and, in order to capture a projected image, transillumination 35 emitted from below the work piece W.

In dimension measurement with the image measuring device, image processing is performed on a captured image of the work piece, edge detection is performed, and a dimension of the work piece is measured by determining a distance between edges. Therefore, in order to measure the dimension with a high degree of accuracy, capturing an accurate optical image of the work piece on the stage is crucial.

When light strikes from below the work piece W due to the transillumination 35, although light is blocked by a portion of the work piece W, as shown in FIG. 14A, the light is transmitted without being blocked on both ends of the work piece W. Therefore, edges between light and dark are formed in a light-receiving surface of the image capturer 40 by the light transmitted past both ends of the work piece W and passing through the group of lenses 31, and by measuring a distance between the edges (i.e., a width of a dark portion), a width of the work piece W can be measured.

However, in a case where the work piece W has more than a set thickness, a portion of the light transmitted past the two ends of the work piece W in the case of the thin work piece W shown in FIG. 14A is blocked by the work piece W as shown in FIG. 14B, and an amount of light transmitted past both ends is reduced. As a result, a width of a dark portion observed in an image capture element of the image capturer 40 increases and a measured value m becomes larger than a true value r.

When measuring dimensions of a plurality of products manufactured with identical or closely similar design values, there may be a similar trend for such a measurement error based on a shape of a work piece to occur for the plurality of products.

SUMMARY OF THE INVENTION

The present invention provides an image measuring method and image measuring device capable of appropriately correcting a measured value obtained by the image measuring device and therefore capable of performing dimension measurement with a high degree of accuracy.

(1) The image measuring method of the present invention is an image measuring method performed with an image measuring device measuring a dimension of a measured object from an image of the measured object captured by an image capturer. The method executes: a standard reference object measurement measuring a dimension of the standard reference object with the image measuring device; a standard reference dimension input inputting a dimension of the standard reference object specified by a device other than the image measuring device; a preset value calculation calculating a preset value from the dimension of the standard reference object measured by the image measuring device and a dimension of the standard reference object measured by a predetermined measurement tool; a measurement measuring a dimension of a measured object other than the standard reference object using the image measuring device; and a correction correcting the dimension of the measured object other than the standard reference object measured by the image measuring device, using the preset value to perform the correction. In the preset value calculation, the preset value may be calculated by taking a difference between the dimension of the standard reference object measured by the image measuring device and the dimension of the standard reference object specified by the device other than the image measuring device. In the correction, the correction may be performed for the measured object other than the standard reference object by taking a difference between the dimension measured by the image measuring device and the preset value.

In this way, an amount by which a measured value obtained by the image measuring device deviates from the dimension of the standard reference object, which is accurately specified by a device other than the image measuring device, is readied as the preset value and, when measuring the dimension of a work piece other than the standard reference object with the image measuring device, the measured value is corrected by the preset value. Accordingly, more highly accurate measurement results can be obtained.

(2) A master work piece, which is one among a plurality of measured objects, may be designated as the standard reference object; a dimension of the master work piece measured by the predetermined measurement tool may be input in the standard reference dimension input; a dimension of a measured object other than the master work piece, from among the plurality of measured objects, may be measured by the image measuring device in the measurement; and the dimension of the measured object other than the master work piece, from among the plurality of measured objects, which is measured by the image measuring device, may be corrected using the preset value in the correction. The plurality of measured objects are preferably a plurality of objects generating a similar trend of measurement errors in measured values obtained by the image measuring device, for example. The similar trend of measurement errors may occur based on, for example, thickness of a measured object, cross-sectional shape, and optical characteristics of a material.

Accordingly, measured values for a plurality of measured objects can be corrected appropriately, and therefore dimension measurement can be performed with a high degree of accuracy. In particular, the present invention corrects the measured values of a plurality of work pieces (measured objects) using a shared preset value, and is therefore effective for application in inspection of a plurality of products manufactured with identical or closely similar design values, for example, for which a similar trend of measurement errors may occur (based on thickness of the work pieces, cross-sectional shape, or optical characteristics of a material, for example) in measured values obtained by the image measuring device.

(3) The image measuring device of the present invention is an image measuring device measuring a dimension of a measured object from an image of the measured object captured by an image capturer. The device further includes: an inputter inputting a dimension of a standard reference object specified by a device other than the image measuring device; a preset value calculator calculating a preset value from the dimension of the standard reference object measured by the image measuring device and the dimension of the standard reference object specified by the device other than the image measuring device; and a corrector correcting a dimension of a measured object other than the standard reference object measured by the image measuring device, using the preset value to perform the correction. The preset value calculator may calculate the preset value by taking a difference between the dimension of the standard reference object measured by the image measuring device and the dimension of the standard reference object specified by the device other than the image measuring device. The corrector may perform correction for the measured object other than the standard reference object by taking a difference between the dimension measured by the image measuring device and the preset value.

In this way, an amount by which a measured value obtained by the image measuring device deviates from the dimension of the standard reference object, which is accurately specified by a device other than the image measuring device, is readied as the preset value and, when measuring the dimension of a work piece other than the standard reference object with the image measuring device, the measured value is corrected by the preset value. Accordingly, more highly accurate measurement results can be obtained.

(4) A master work piece, which is one among a plurality of measured objects, may be designated as the standard reference object; a dimension of the master work piece measured by a predetermined measurement tool may be input on the inputter; and the corrector may correct, using the preset value, the dimension of the measured object other than the master work piece, from among the plurality of measured objects, which is measured by the image measuring device. The plurality of measured objects are preferably a plurality of objects generating a similar trend of measurement errors in measured values obtained by the image measuring device, for example. The similar trend of measurement errors may occur based on, for example, thickness of a measured object, cross-sectional shape, and optical characteristics of a material.

Accordingly, measured values for a plurality of measured objects can be corrected appropriately, and therefore dimension measurement can be performed with a high degree of accuracy. In particular, the present invention corrects the measured values of a plurality of work pieces (measured objects) using a shared preset value, and is therefore effective for application in inspection of a plurality of products manufactured with identical or closely similar design values, for example, for which a similar trend of measurement errors may occur (based on thickness of the work pieces, cross-sectional shape, or optical characteristics of a material, for example) in measured values obtained by the image measuring device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Exemplary Configuration of Apparatus

Figure 1:
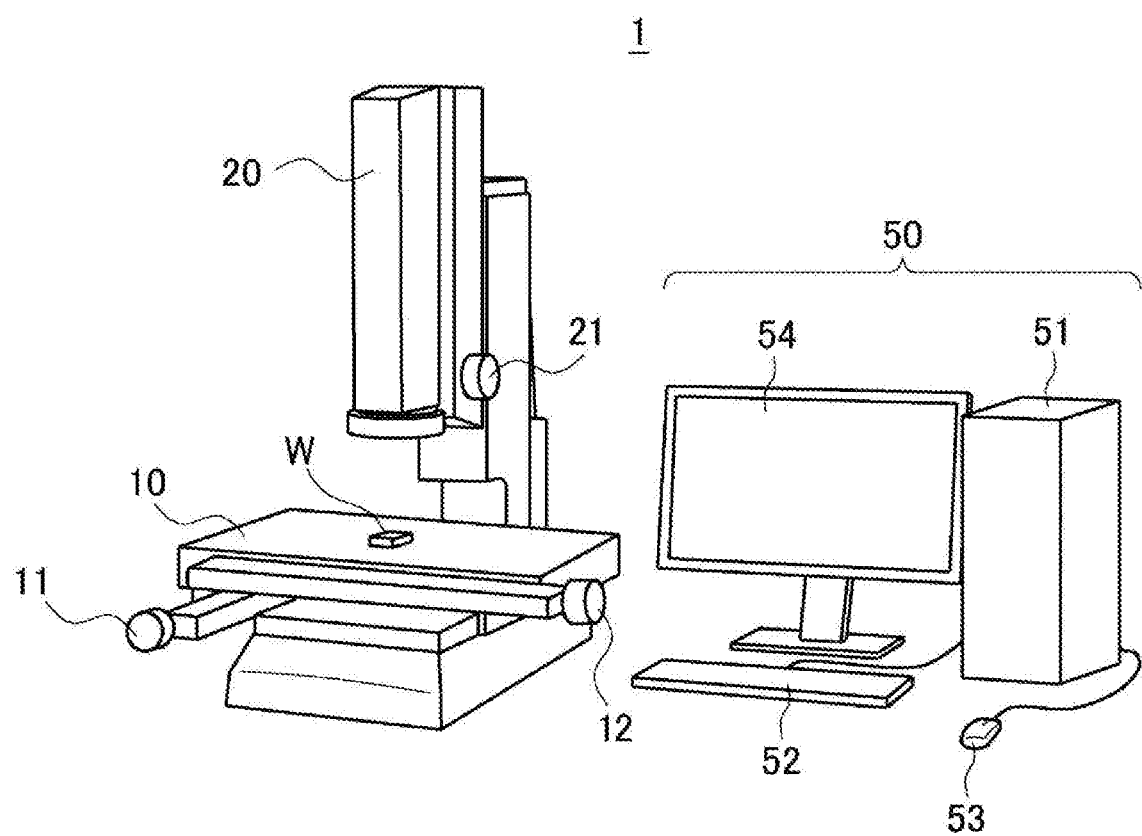
FIG. 1 illustrates an exemplary image measuring device on which an image measuring method is executed, according to the present invention.
Figure 13:
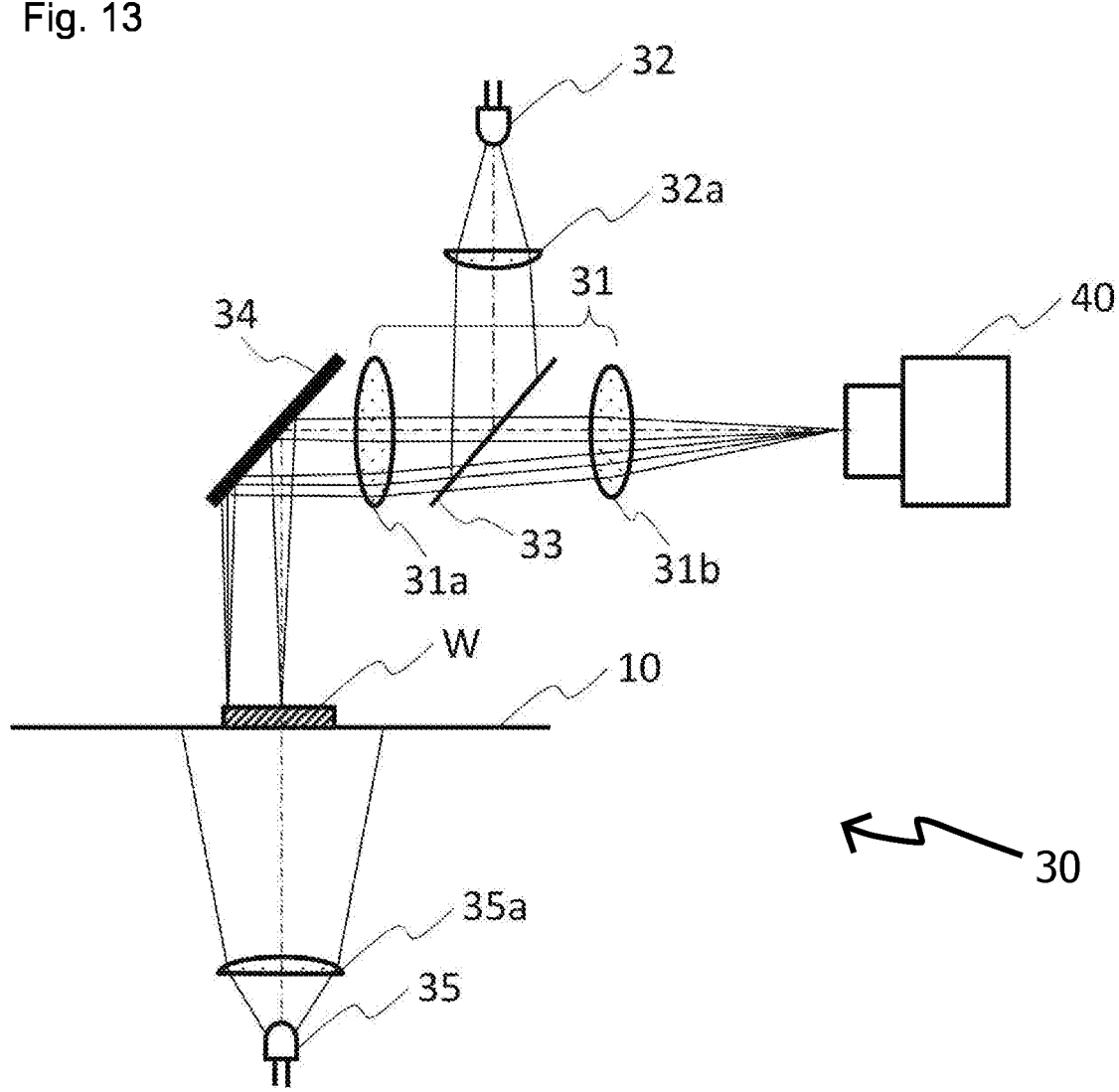
FIG. 13 is a schematic view illustrating a configuration of an image capturer and an optical system that includes an optical path of the image measuring device.
Figure 14A:
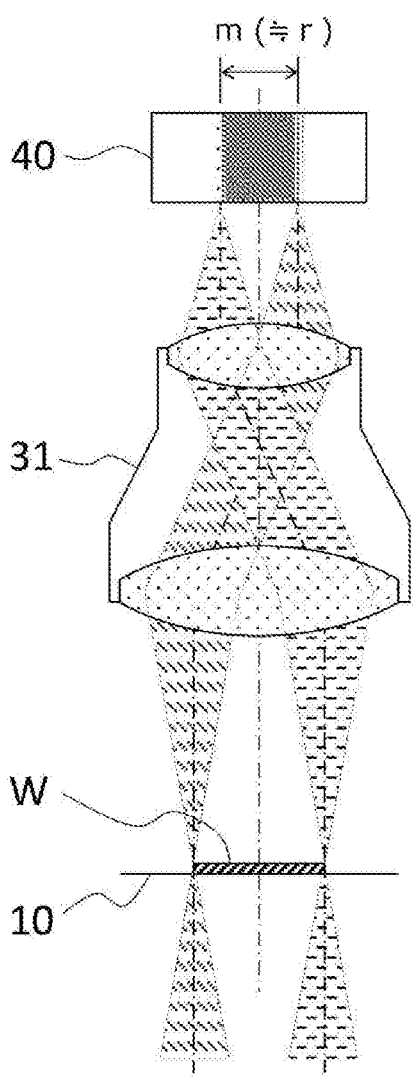
FIGS. 14A and 14B are explanatory diagrams illustrating a cause of an error occurring in a dimension measurement value due to thickness of a work piece.
Figure 14B:
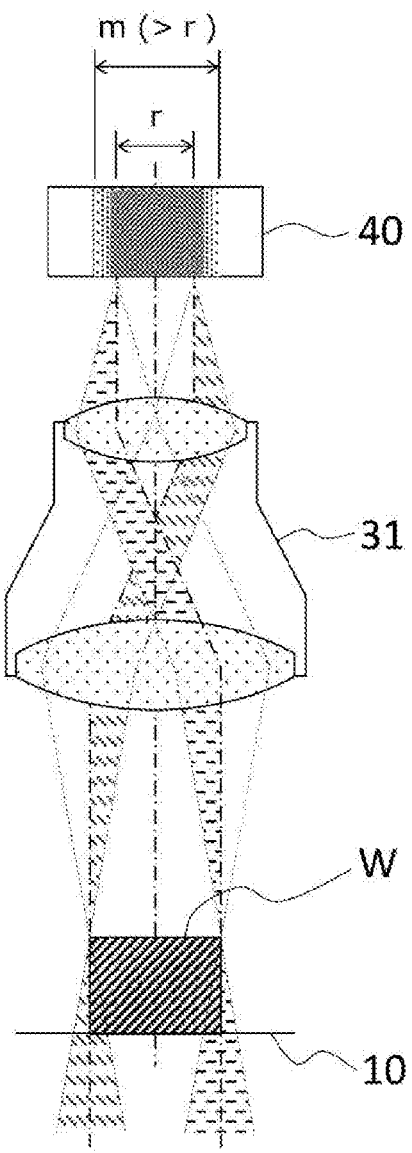

FIG. 1 is a perspective view illustrating an exemplary configuration of an image measuring device 1 according to the present invention, which incorporates an optical system 30 and image capturer 40 having the configuration shown in FIG. 13 and described as conventional to the art. The image measuring device 1 includes a stage 10, a casing 20, and a computer system 50.

The stage 10 is arranged such that a top surface of the stage 10 aligns with a horizontal plane, and a work piece W is placed on this top surface. The stage 10 is capable of displacement in an X axis direction and a Y axis direction by rotation operation of handles 11 and 12. The casing 20 encloses the optical system 30 and the image capturer 40. The casing 20 is also capable of displacement, together with the optical system 30 and the image capturer 40, in a Z axis direction by rotation operation of a handle 21.

The optical system 30 emits illumination light at the work piece W placed on the stage 10 and also forms an image of the work piece W on a light-receiving surface of the image capturer 40. As shown in FIG. 13, the optical system 30 includes a group of lenses 31, epi-illumination 32, a beam splitter 33, a mirror 34, and transillumination 35.

The group of lenses 31 is divided into, for example, a front group 31a and a rear group 31b. At this point, when arranged such that a rear side focal point of the front group 31a coincides with a front side focal point of the rear group 31b, the optical system 30 which includes the group of lenses 31 configures a double telecentric optical system. However, the present invention is not limited to a telecentric optical system and can also be applied to generic lenses (non-telecentric optical systems), and there is no particular limitation on the lens optical system or an illumination system described below.

The epi-illumination 32 is a light source including a light-emitting element such as a light-emitting diode, for example. In general, the epi-illumination 32 is introduced in combination with a lens 32a which restricts a diffusion direction of diffused light that is emitted. The diffused light emitted by the epi-illumination 32 strikes the beam splitter 33 via the lens 32a. The epi-illumination 32 is primarily used when measuring dimensions of a non-through-hole, a step, or unevenness on the work piece W.

The beam splitter 33 is arranged between the front group 31a and the rear group 31b, for example, and reflects light from the epi-illumination 32 along an optical axis of the group of lenses 31 in a direction of the stage 10, where the work piece W is placed. In addition, the beam splitter 33 is transparent to incident light entering from the stage 10 side through the front group 31a, and allows the light to strike the rear group 31b. A film of polyester, for example, which has an appropriate transmittance/reflectance, may be used as the beam splitter 33.

When an orientation of the optical axis must be changed, a mirror 34 is introduced to the structure of the optical system 30. In the example shown in FIG. 11, the mirror 34 causes light passing through the group of lenses 31 to be directed toward the stage 10, on which the work piece W is placed, and strike perpendicular to the stage 10, and also causes light reflected by the work piece W and light from the transillumination 35 to strike the group of lenses 31.

The transillumination 35 is a light source including a light-emitting element such as a light-emitting diode, for example. In general, the transillumination 35 is introduced in combination with a lens 35a which restricts the diffusion direction of diffused light that is emitted. The light emitted by the transillumination 35 bombards the work piece W through the lens 35a, and light which transits without being blocked by the work piece W passes to the mirror 34 and the group of lenses 31 and is received by the image capturer 40. Therefore, the transillumination 35 is primarily used when measuring an external dimension of the work piece W.

A photoreceiver element of the image capturer 40 is a two-dimensional image sensor such as a CCD, CMOS, and the like. An image of the work piece W is formed by the optical system 30 on the light-receiving surface of the image capturer 40. The image capturer 40 captures the formed image and outputs an image signal. The image signal output by the image capturer 40 is imported into the computer system 50.

Figure 2:
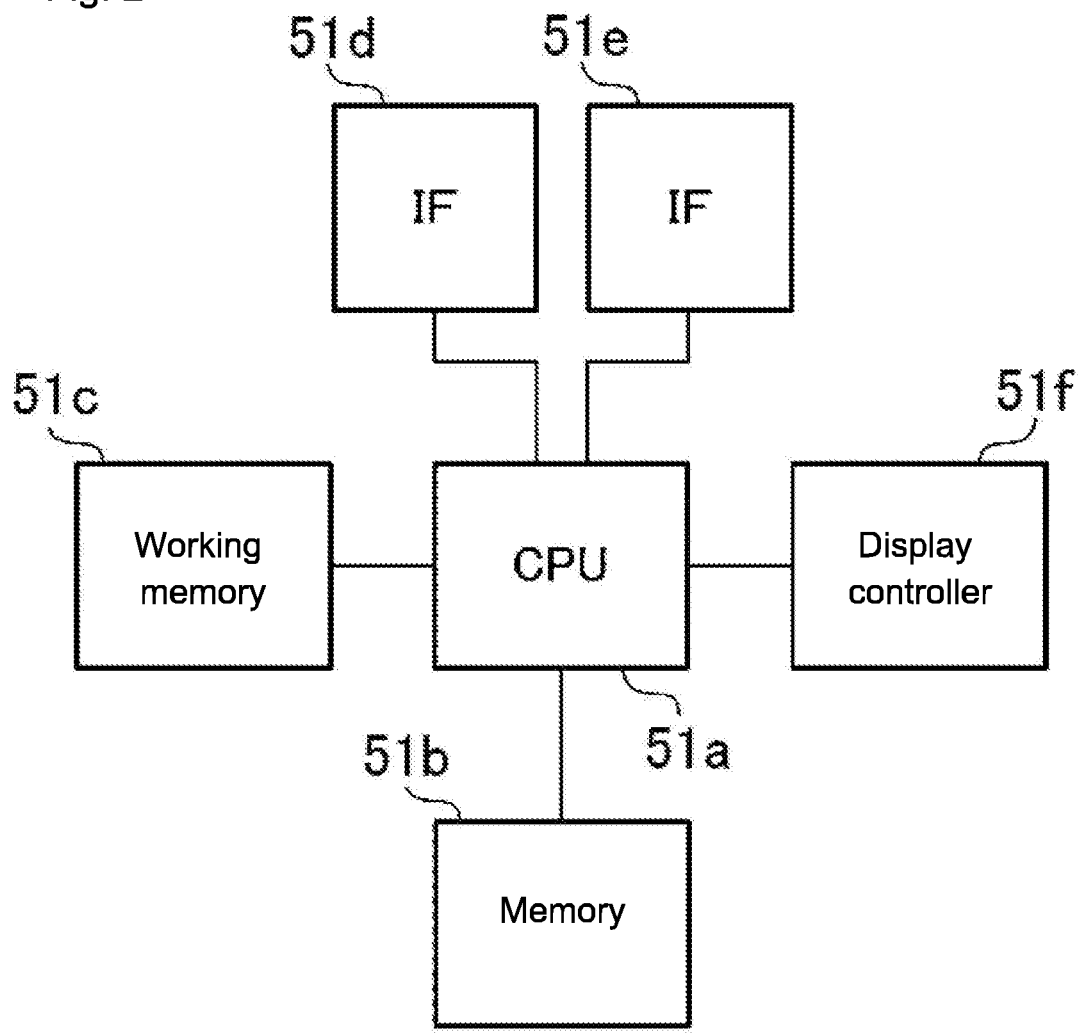
FIG. 2 is a block diagram illustrating a configuration of a computer main body included in the image measuring device.

Returning to FIG. 1, the computer system 50 includes a computer main body 51, a keyboard 52 and a mouse 53 as inputters or inputs, and a display screen 54. FIG. 2 is a block diagram illustrating a configuration of the computer main body 51. As shown in FIG. 2, the computer main body 51 includes a CPU 51a as a control center; a memory 51b; a working memory 51c; interfaces (indicated by "IF" in FIGS. 2) 51d and 51e; and a display controller 51f controlling display on the display screen 54.

Instruction information from an operator, input using the keyboard 52 or mouse 53, is input to the CPU 51a via the interface 51d. The interface 51e is connected to the optical system 30 and image capturer 40, supplies various control signals from the CPU 51a to the optical system 30 and image capturer 40, and receives various kinds of status data and measurement results from the optical system 30 and image capturer 40 which are input to the CPU 51a.

The display controller 51f displays, on the display screen 54, an image in accordance with the image signal supplied from the image capturer 40. In addition to the image captured by the image capturer 40, the display controller 51f also displays on the display screen 54 an interface for inputting control instructions to the image measuring device 1, a tools interface for analyzing the captured image, and the like.

The working memory 51c provides a work space for the various processes of the CPU 51a. The memory 51b is configured by, for example, a hard disk drive, RAM, registry, and the like and stores programs executed by the CPU 51a, image data obtained by capturing images with the image capturer 40, and the like.

The CPU 51a executes various processes based on various kinds of input data from the respective interfaces, instructions from the operator, programs stored in the memory 51b, and the like. The processes executed by the CPU 51a may include, for example, control of the epi-illumination 32, the transillumination 35, and the image capturer 40; image capture of a two-dimensional image using the image capturer 40; and analysis of the captured image data.

Preparation for Measurement

Prior to beginning measurement, a master work piece (standard reference piece) is selected from among a plurality of measured objects W. Any desired method of selecting the master work piece may be used. In the present invention, measured values of a plurality of work pieces (measured objects) W are corrected using a shared preset value, and therefore, for example, several work pieces W may be extracted from the plurality of work pieces W and measured with a predetermined measurement tool, and of these a work piece W having average dimensions or a work piece W closest to a design value may be selected as the master work piece.

Dimensions of the selected master work piece are measured by the predetermined measurement tool. In the present invention, these dimensions are defined as standard reference dimensions for calculating the preset value, and therefore a measurement tool capable of highly accurate measurements is preferably used as the predetermined measurement tool, such as a micrometer, dial gauge, coordinate measuring device, and the like.

Figure 3:
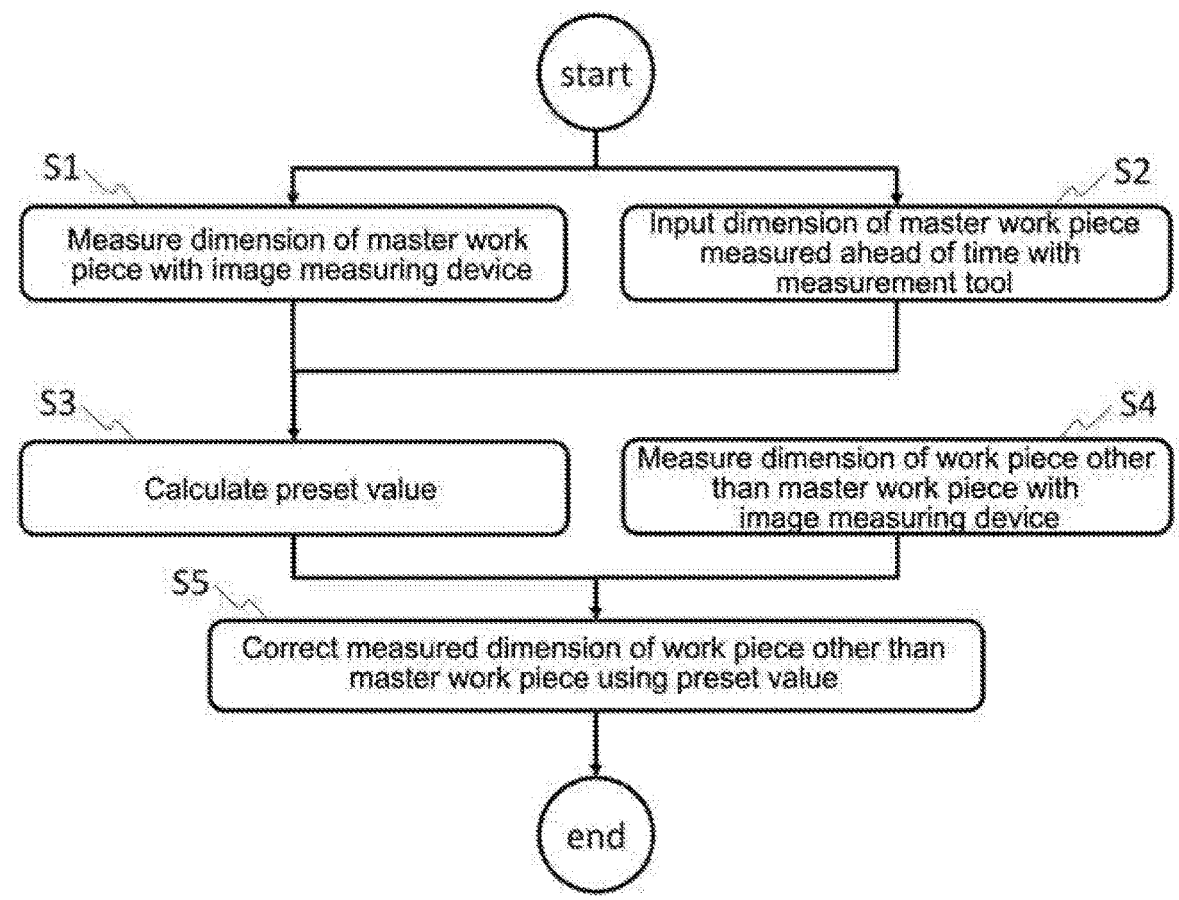
FIG. 3 illustrates a procedural flow chart of the image measuring method according to the present invention.

Detailed Method for Correcting Measured Value, and Method of Performing Correction in Image Measuring Device An image measuring method according to the present invention uses the image measuring device 1 and is executed by a procedural flow shown in FIG. 3, for example. First, the dimension of the master work piece is measured by the image measuring device 1 (S1). Then, the dimension measurement value of the master work piece measured by the predetermined measurement tool is input from the inputter, such as the keyboard 52 or mouse 53 (S2). These measured or input measured values are stored in the memory 51b or the working memory 51c.

Next, the preset value is calculated from the dimension measurement value of the master work piece obtained by the image measuring device 1 and the dimension measurement value of the master work piece obtained by the predetermined measurement tool (S3), and is stored in the memory 51b or the working memory 51c. The preset value aids correction of an error occurring based on an affinity between the image measuring device 1 and the plurality of work pieces W (measured objects), and therefore a preset value must be prepared for the image measuring device 1 and/or each of the plurality of work pieces W. Calculation of a preset value P uses a measured value PM obtained by the image measuring device 1, which is read from the memory 51b or the working memory 51c, and a measured value PT obtained by the measurement tool, and the CPU 51a executes the calculation based on a program stored ahead of time in the memory 51b. In other words, these structural elements of the computer main body 51 work together to produce a preset value calculator in the image measuring device 1. The preset value P is found by subtracting the measured value PT obtained by the measurement tool from the measured value PM obtained by the image measuring device 1, for example (i.e., P=PM−PT).

Next, a dimension of a work piece W other than the master work piece from the plurality of work pieces W is measured by the image measuring device 1 (S4) and is stored in the memory 51b or the working memory 51c.

Then, the dimension measurement value obtained by the image measuring device 1 for the work piece W other than the master work piece is corrected using the preset value (S5), and the resulting corrected value is output in any desired format, such as displayed on the display screen 54, stored in the memory 51b or working memory 51c, and the like. Calculation of a corrected value C uses a measured value M obtained by the image measuring device 1, which is read from the memory 51b or the working memory 51c, and the preset value P and the CPU 51a executes the calculation based on a program stored ahead of time in the memory 51b. In other words, these structural elements of the computer main body 51 work together to produce a corrector in the image measuring device 1. In a case where the preset value P is found by subtracting the measured value PT obtained by the measurement tool from the measured value PM obtained by the image measuring device 1 in S3, for example (i.e., when P=PM−PT), the corrected value C is found by subtracting the preset value P from the measured value M obtained by the image measuring device 1. Specifically, when PM=5.0052 mm and PT=5.0011 mm for the master work piece, for example, P=0.0041 mm can be set as the preset value and when M=5.0035 mm for the measured work piece W, the corrected value C can be found by C=M−P=4.9994 mm.

Exemplary Configuration of GUI of Image Measuring Device Executing Image Measuring Method of Present Invention In order to smoothly execute the image measuring method according to the present invention, a GUI of the image measuring device may be configured with the following flow, for example (see FIGS. 4 to 12).

Figure 4:
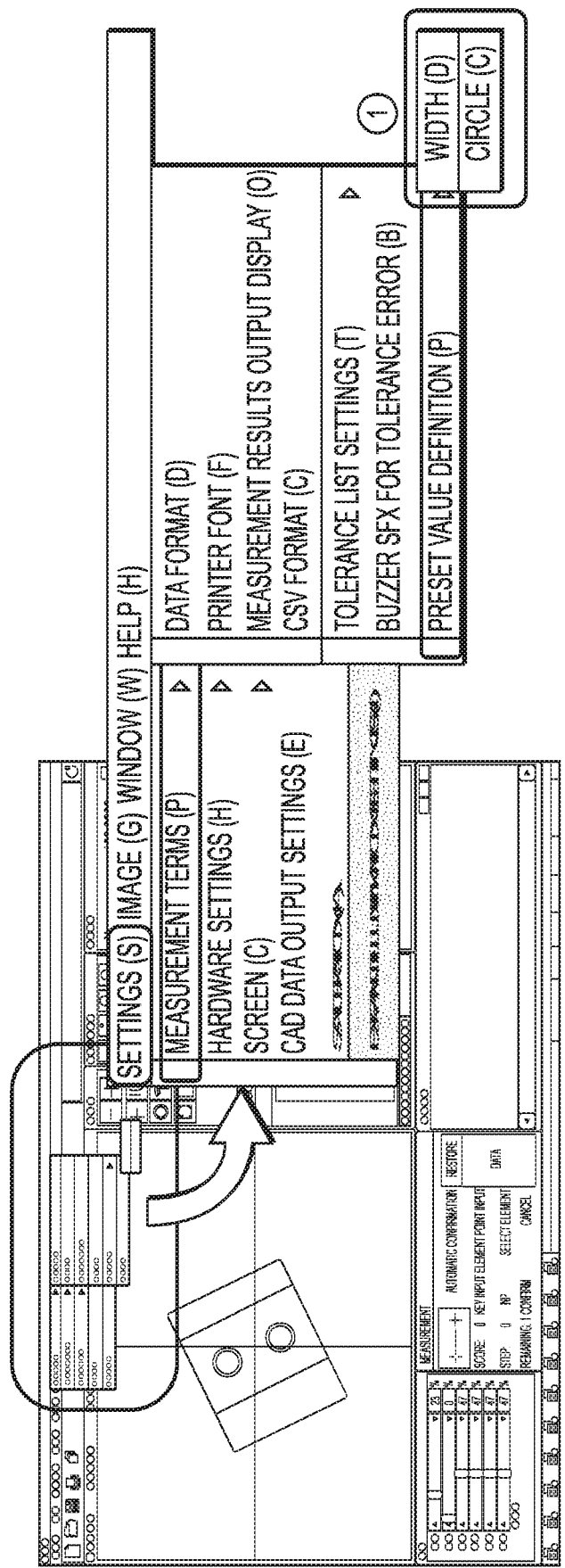
FIG. 4 illustrates an exemplary configuration of a GUI of the image measuring device executing the image measuring method according to the present invention (1/9)

1. Define Preset Value (1) Execute a preset value definition command provided in a main menu and select dimension to be measured (for example, width or circle) (FIG. 4).

Figure 5:
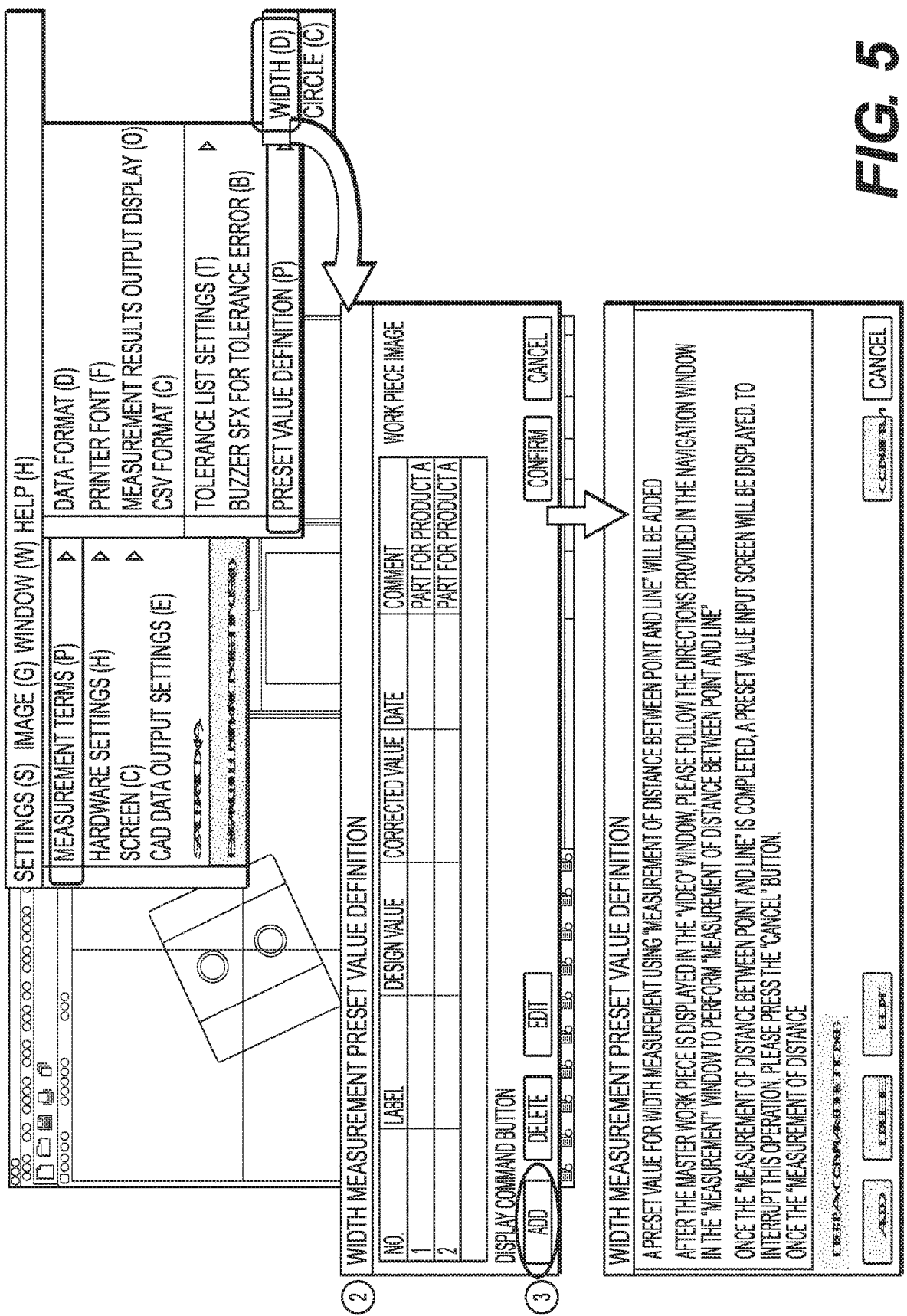
FIG. 5 illustrates an exemplary configuration of the GUI of the image measuring device executing the image measuring method according to the present invention (2/9)

(2) "Preset value definition" dialog appears and an overview of preset values already registered is displayed (FIG. 5).

(3) When "Add" button on "Preset value definition" dialog is clicked, displayed contents of the "Preset value definition" dialog change to a guidance message (FIG. 5).

Figure 6:
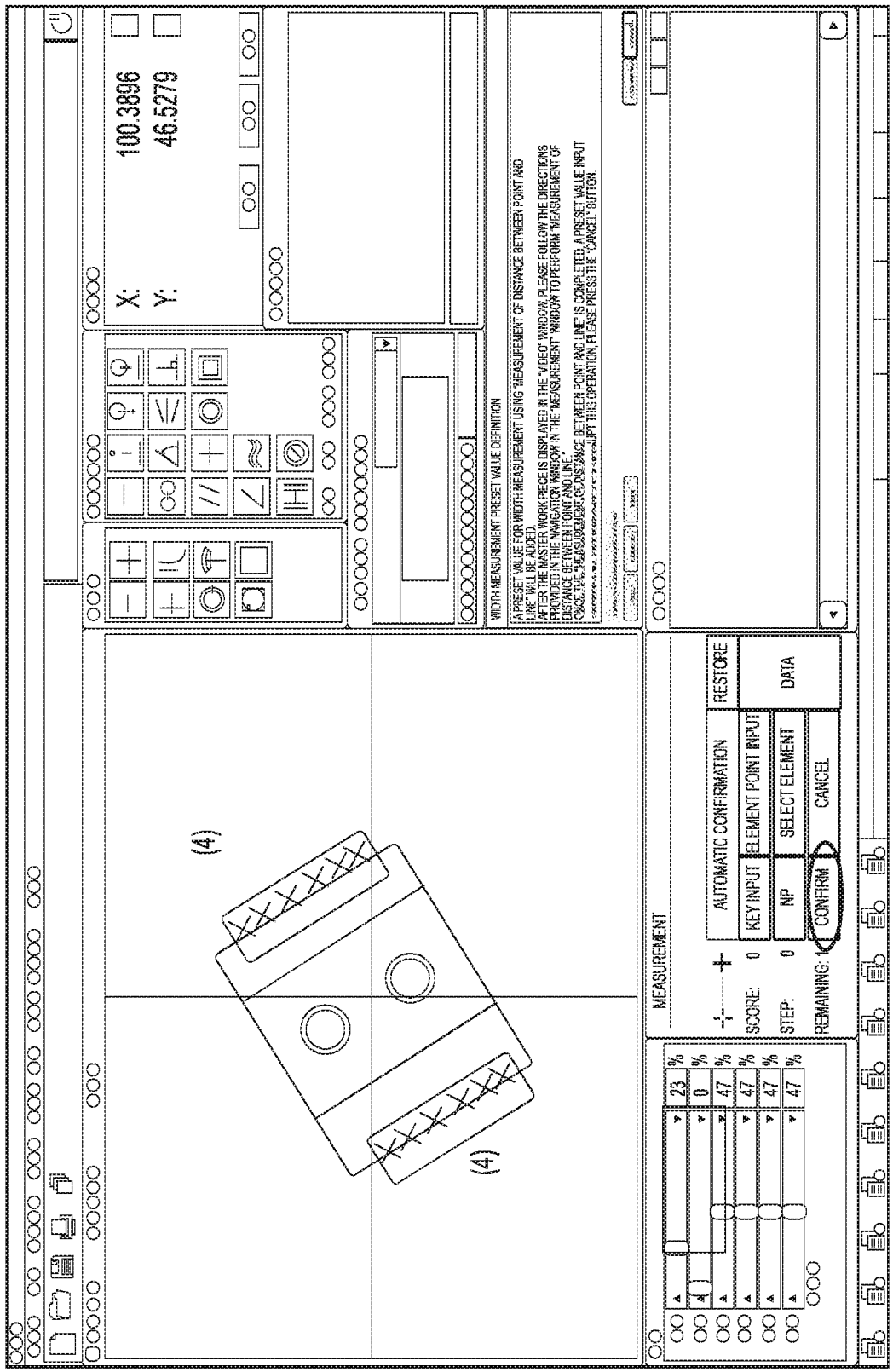
FIG. 6 illustrates an exemplary configuration of the GUI of the image measuring device executing the image measuring method according to the present invention (3/9)

(4) "Width (distance between point and line) measurement" or "Circle measurement" of the master work piece is performed in accordance with guidance instruction (FIG. 6). This corresponds to the execution instruction in S1 of FIG. 3.

(5) When measurement is completed, click a "Confirm" button in a "Measurement" window (FIG. 6).

Figure 7:
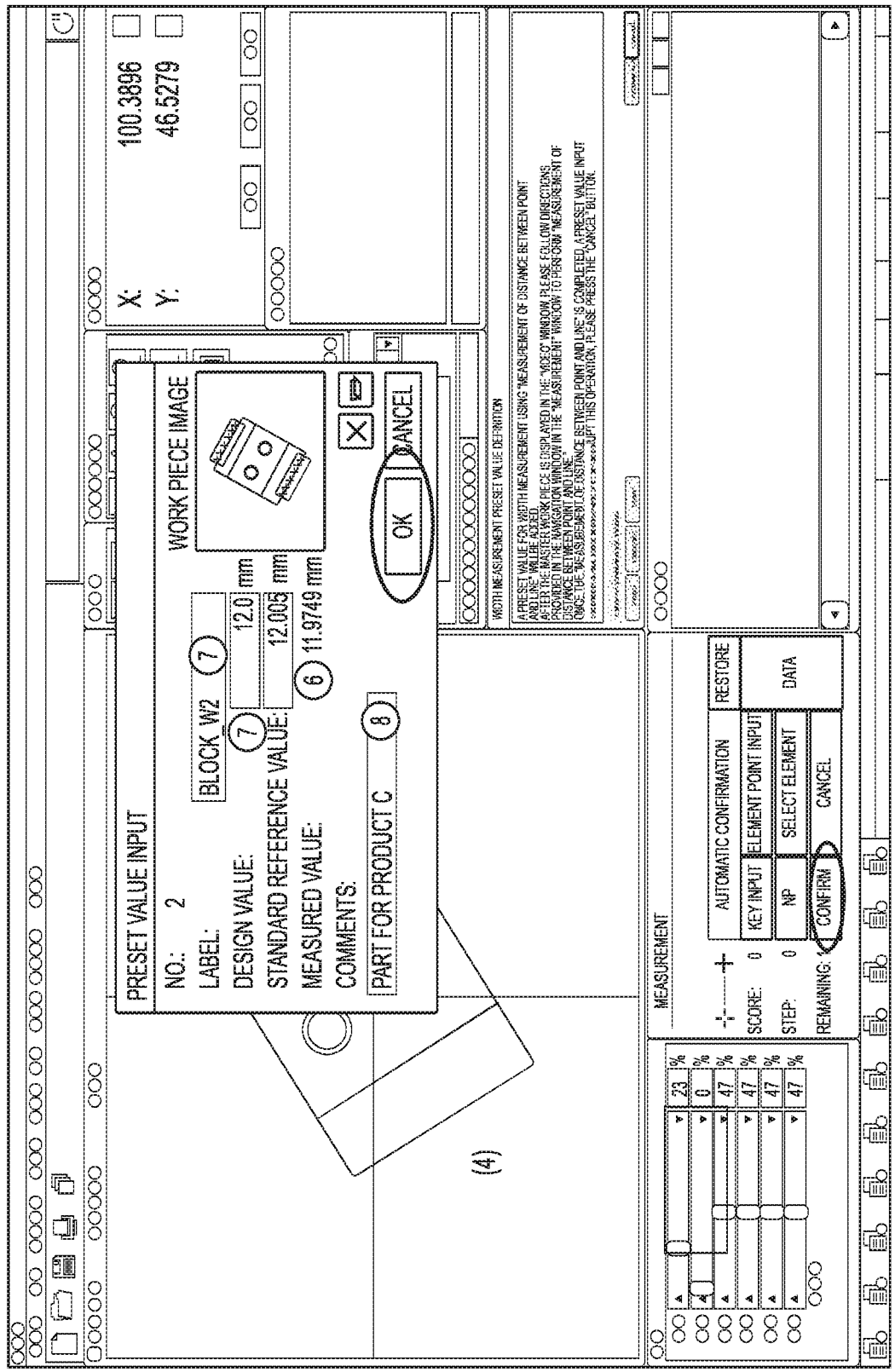
FIG. 7 illustrates an exemplary configuration of the GUI of the image measuring device executing the image measuring method according to the present invention (4/9)

(6) "Preset value input" dialog is displayed and the measured values from (4) are displayed (FIG. 7).

(7) A dimension measurement value of the master work piece measured by the measurement tool before beginning is input as the standard reference value (FIG. 7). This corresponds to S2 of FIG. 3. Also, a label (name) of the preset value is input. Shared use of preset value data on a plurality of measuring devices is facilitated by performing file management at this point and affixing a label name that does not duplicate any other label name.

(8) Click "OK" button on "Preset value input" dialog (FIG. 7). The preset value is then calculated. This corresponds to the execution instruction in S3 of FIG. 3.

Figure 8:
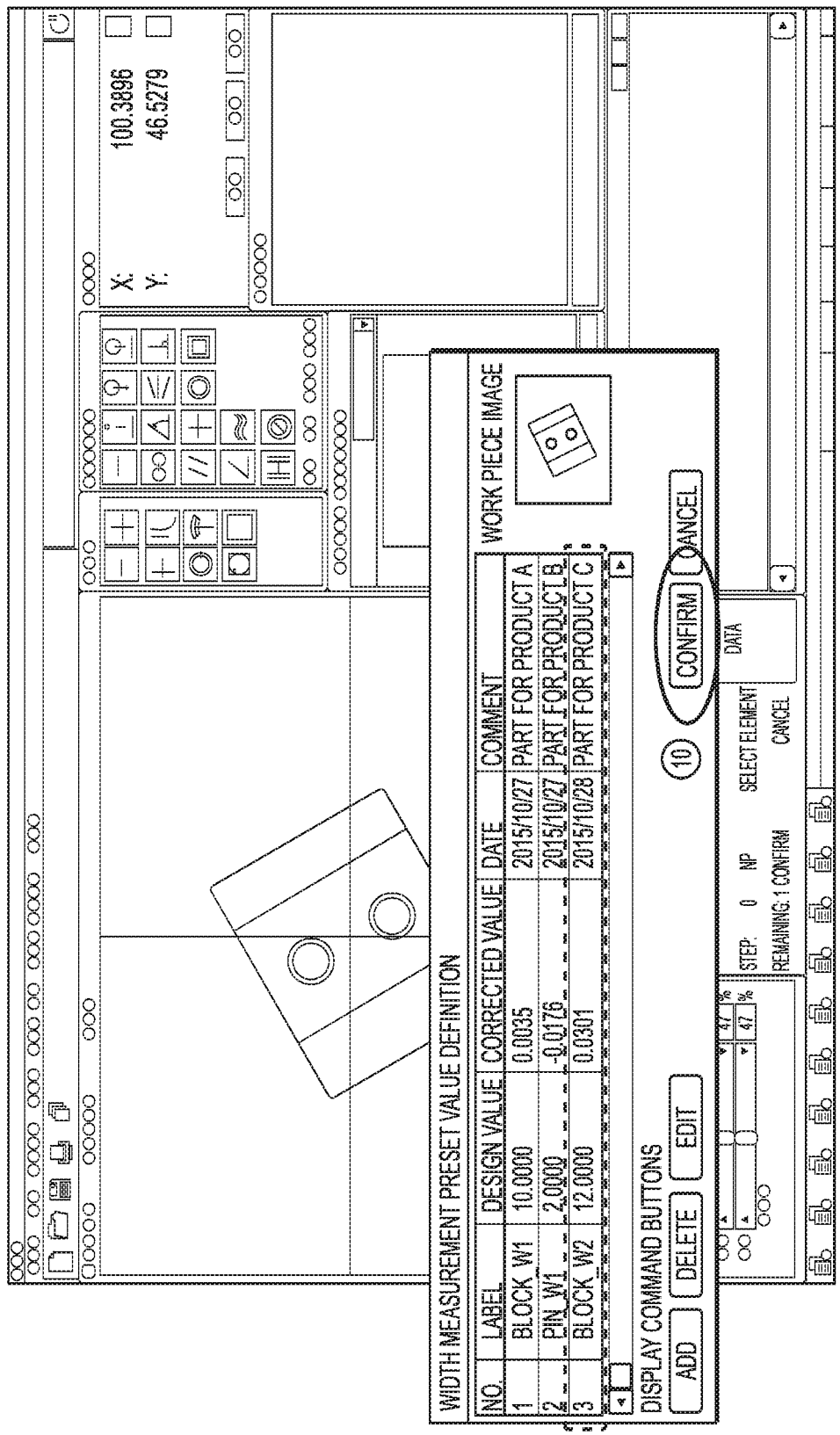
FIG. 8 illustrates an exemplary configuration of the GUI of the image measuring device executing the image measuring method according to the present invention (5/9)

(9) Refresh the display of the "Preset value definition" dialog and additional display of preset values is provided (FIG. 8).

(10) When "Confirm" button on "Preset value definition" dialog is clicked, the preset value is registered and is stored in the registry (FIG. 8).

Figure 9:
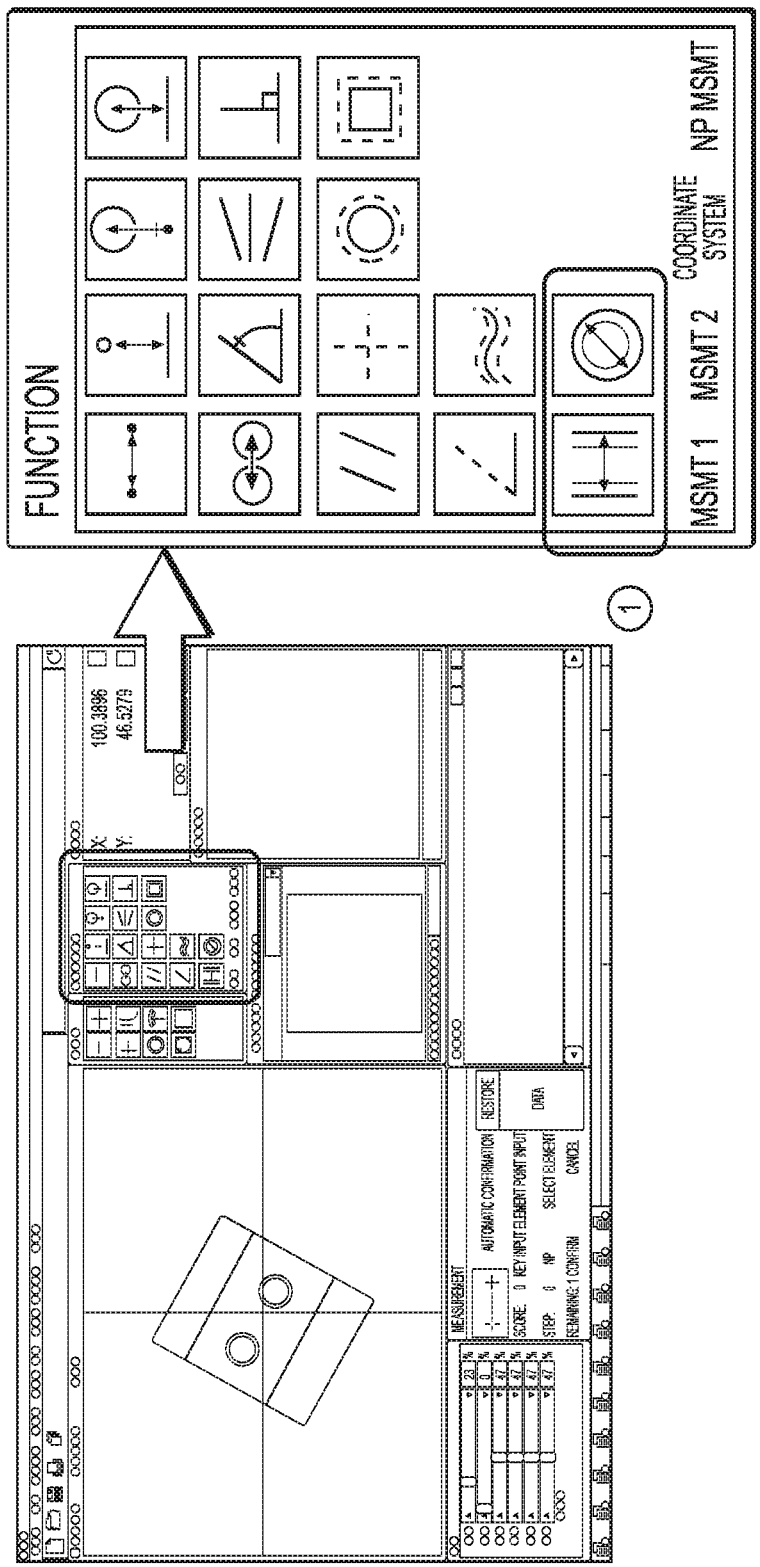
FIG. 9 illustrates an exemplary configuration of the GUI of the image measuring device executing the image measuring method according to the present invention (6/9)

2. Run Preset Measurement (1) Click preset measurement command button in "Function" window (FIG. 9).

Figure 10:
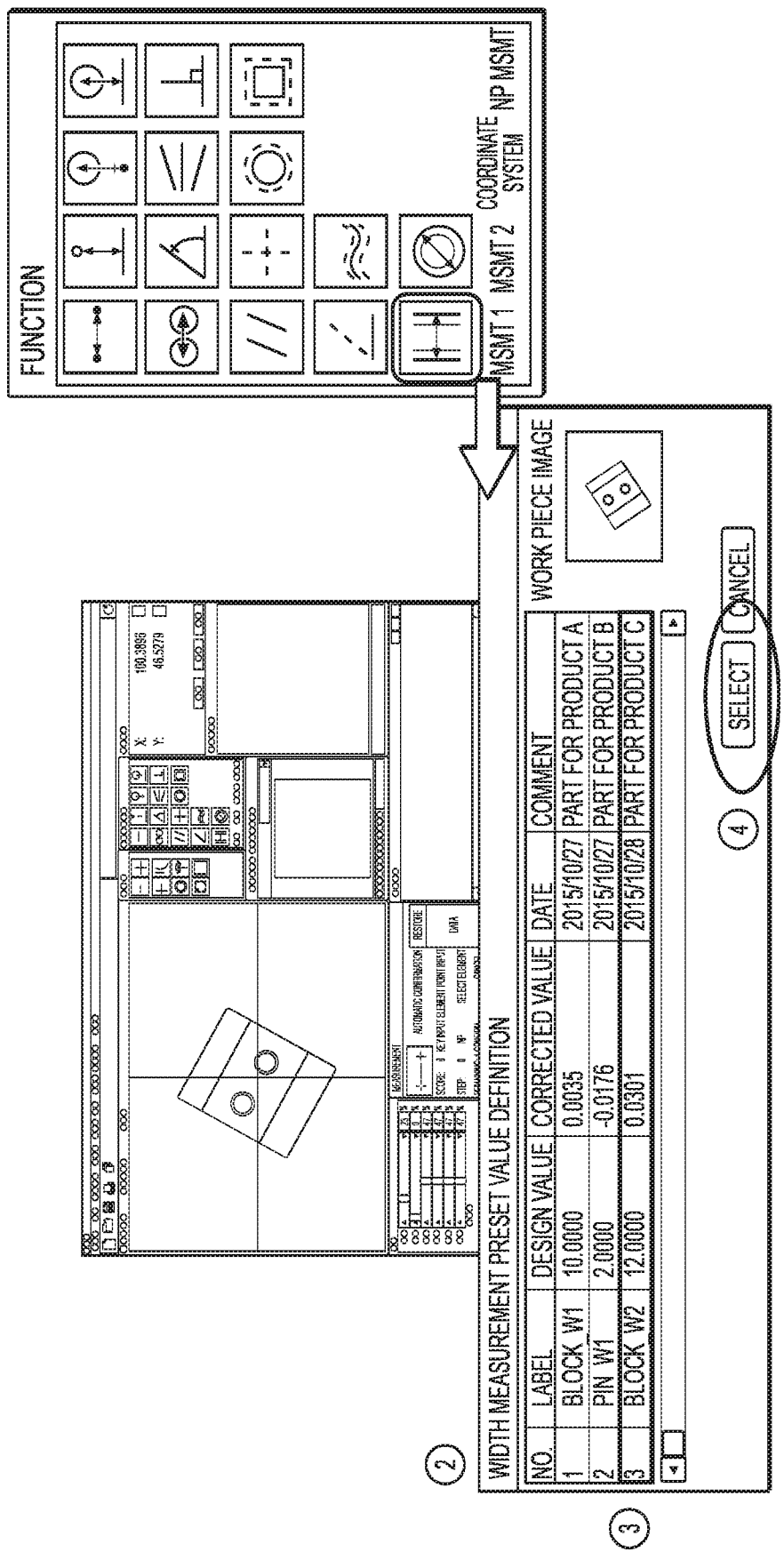
FIG. 10 illustrates an exemplary configuration of the GUI of the image measuring device executing the image measuring method according to the present invention (7/9)

(2) Display "Preset value" dialog and display overview of preset values already registered (FIG. 10).

(3) Select (mouse click) preset value to be used in correction from preset value overview (FIG. 10).

(4) Click "Select" button on "Preset value" dialog (FIG. 10).

Figure 11:
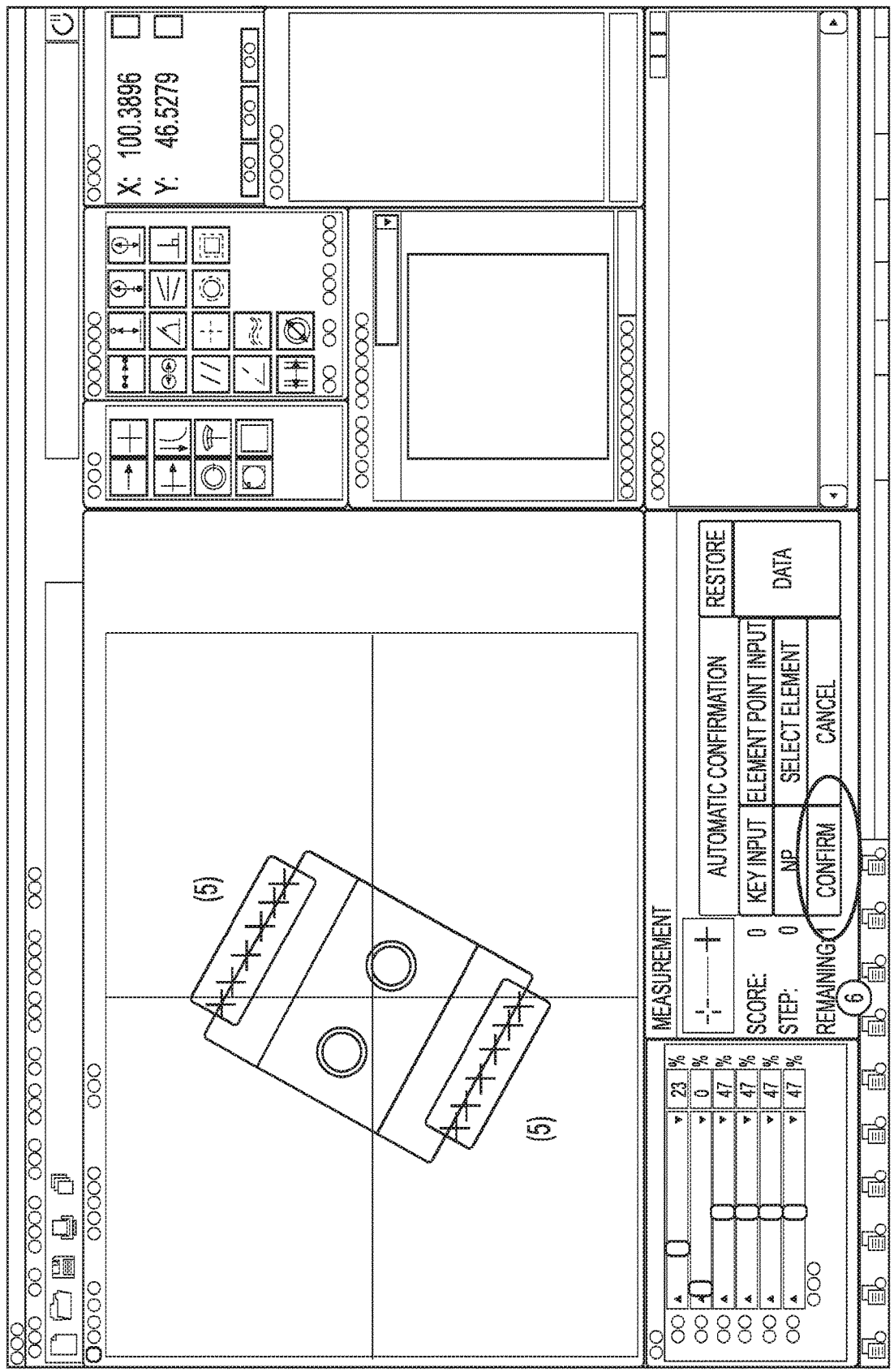
FIG. 11 illustrates an exemplary configuration of the GUI of the image measuring device executing the image measuring method according to the present invention (8/9)

(5) Perform "Width (distance between point and line) measurement" or "Circle measurement" of the work piece to be measured in accordance with guidance instruction (FIG. 11). This corresponds to the execution instruction in S4 of FIG. 3.

Figure 12:
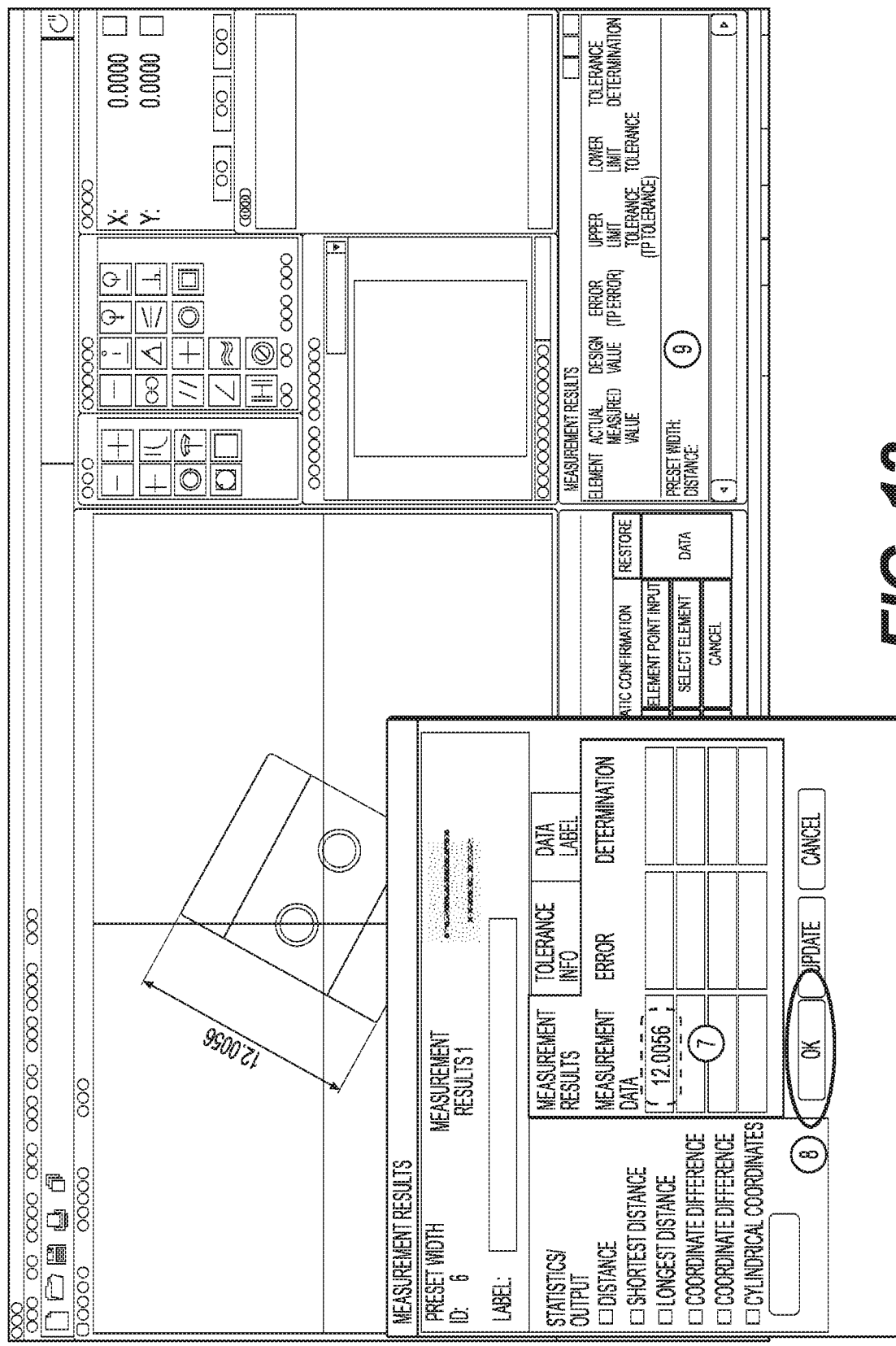
FIG. 12 illustrates an exemplary configuration of the GUI of the image measuring device executing the image measuring method according to the present invention (9/9)

(6) When measurement is completed, click "Confirm" button in the "Measurement" window (FIG. 11). Accordingly, the corrected value is calculated. This corresponds to the execution instruction in S5 of FIG. 3.
(7) Display "Measurement results" dialog and the measurement results after preset correction are displayed (FIG. 12).
(8) Click "OK" button on "Measurement results" dialog (FIG. 12).
(9) Results are output to "Measurement results" window (FIG. 12).

In the image measuring method and image measuring device according to the present invention, an amount by which a measured value obtained by the image measuring device deviates from the dimension of a standard reference piece, which is accurately specified by a device other than the image measuring device, is readied as a preset value and, when measuring the dimension of a work piece other than the standard reference piece with the image measuring device, the measured value is corrected by the preset value. Therefore, measurement results having a higher degree of accuracy can be obtained. In particular, the method of the present invention corrects the measured values of a plurality of work pieces (measured objects) using a shared preset value, and is therefore particularly effective when inspecting a plurality of products manufactured with identical or closely similar design values, for example, for which a similar trend of measurement errors may occur in measured values obtained by the image measuring device. The similar trend of measurement errors may occur based on, for example, thickness of a measured object, cross-sectional shape, and optical characteristics of a material. Specifically, in a case where an object has a rectangular shape in cross-section, such as a gauge block, the trend of errors may differ from a case where an object has a round shape in cross-section, such as a pin gauge. However, when the cross-sectional shape is the same, the same trend of errors may occur. In addition, in a case where color is applied to an object, for example, and light is reflected or has difficulty passing through the object, the trend of errors may differ from a case where an object is made of a material transparent to some degree of light, such as glass or resin. However, when the optical characteristics are the same, the same trend of errors may occur.

The various processes of the image measuring method and the various functions of the image measuring device according to the present invention may be combined or split up as necessary. In addition, the present invention may be modified as needed within the scope of the technical ideas reflected in the invention. Embodiments featuring such modifications or improvements are within the technical scope of the present invention.

For example, a reference device may be used as the standard reference piece instead of the master work piece, the reference device being a gauge block or the like formed ahead of time with highly accurate dimensions; the preset value may be found by taking a difference between dimensions of the reference device measured by an image measuring device and dimensions of the reference device specified ahead of time; and measured values of the work piece may be corrected using this preset value. Accordingly, the measurement error which the image measuring device has independent of the work piece can be corrected.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring method for measuring a dimension of a measured object supported by an X-Y-plane movable stage, illuminated from below the stage with a light source, and imaged with an optical system, and an image sensor housed in a Z-direction movable casing, a processor measuring the dimension of a measured object from an image of the measured object captured by the image sensor, the method comprising:
   displaying on a display a first screen displaying at least two selectable icons representing two different dimensions of a standard reference object to be measured and selectable by a user;
   displaying, in response to the user selecting one of the two different dimensions represented by the at least two selectable icons, a second screen on the display displaying a selectable icon, which, when selected, triggers the display of a guidance message relating to measuring the dimension selected on the first screen;
   a) measuring a value of the selected dimension of the standard reference object with the optical system, the image sensor, and a processor in accordance with the displayed guidance to obtain an optical-system measured value of the selected dimension of the standard reference object;
   b) after the measuring operation, inputting a value of the selected dimension of the standard reference object specified by a measurement tool other than the optical system, the image sensor, and the processor to obtain a measurement-tool measured value of the selected dimension of the standard reference object;
   c) subtracting the measurement-tool measured value of the selected dimension of the standard reference object from the optical-system measured value of the selected dimension of the standard reference object to determine a preset value;
   d) measuring a value of a dimension of a measured object other than the standard reference object using the optical system, the image sensor, and the processor to obtain an optical-system measured value of the dimension of the measured object;
   e) correcting the optical-system measured value of the dimension of the measured object other than the standard reference object measured by the optical system, the image sensor, and the processor, by subtracting the preset value from the optical-system measured value of the dimension of the measured object;
   supporting the standard reference object and the measured object on the X-Y-plane movable stage movable in the X and Y directions;
   illuminating the standard reference object and the measured object with the light source spaced from the Z-direction movable casing and located below the X-Y-plane movable stage; and measuring the selected dimension of the standard reference object, and the dimension of the measured object using the optical system and the sensor housed in the Z-direction movable casing movable in the Z direction, supported above the movable stage, and spaced from the light source, wherein the standard reference object to be measured is determined by measuring a plurality of the measured objects with the measurement tool other than the optical system, the image sensor, and the processor, to obtain measurement-tool measured values of the plurality of the measured objects, and selecting the standard reference object to be measured based on an average of the measurement-tool measured values of the plurality of measured objects.

2. The image measuring method according to claim 1, wherein:

the standard reference object is a master work piece from among the plurality of measured objects, the inputting further comprises inputting a value of the dimension of the master work piece measured by a micrometer, a dial gauge, or a coordinate measurement machine, the measuring further comprises measuring a value of the dimension of a measured object other than the master work piece, from among the plurality of measured objects, by the optical system, the image sensor, and the processor, and the correcting further comprises correcting the value of the dimension of the measured object other than the master work piece, from among the plurality of measured objects, which is measured by the optical system, the image sensor, and the processor, using the preset value.

3. The image measuring method according to claim 2, wherein the plurality of measured objects is a plurality of objects generating a similar trend of measurement errors in measured values obtained by the optical system, the image sensor, and the processor.

4. The image measuring method according to claim 3, wherein the similar trend of measurement errors in measured values obtained by the optical system, the image sensor, and the processor occur based on at least one of a thickness of a measured object, cross-sectional shape, and optical characteristics of a material.

5. The image measuring method according to claim 2, wherein:

the standard reference object is a master work piece from among the plurality of measured objects, the inputting further comprises inputting a value of the dimension of the master work piece measured by a micrometer, a dial gauge, or a coordinate measurement machine, the measuring further comprises measuring a value of the dimension of a measured object other than the master work piece, from among the plurality of measured objects, by the optical system, the image sensor, and the processor, and the correcting further comprises correcting the value of the dimension of the measured object other than the master work piece, from among the plurality of measured objects, which is measured by the optical system, the image sensor, and the processor, using the preset value.

6. The image measuring method according to claim 5, wherein the plurality of measured objects is a plurality of objects generating a similar trend of measurement errors in measured values obtained by the optical system, the image sensor, and the processor.

7. The image measuring method according to claim 6, wherein the similar trend of measurement errors in measured values obtained by the optical system, the image sensor, and the processor occur based on at least one of a thickness of a measured object, cross-sectional shape, and optical characteristics of a material.

8. The image measuring method according to claim 1, wherein the at least two selectable icons of the first screen comprise a width icon representing the measurement of a width of the standard reference object, and a circle icon representing a circle measurement of the standard reference object.

9. The image measuring method according to claim 1, wherein the at least two selectable icons of the first screen comprise at least two selectable real-world-object-measurement icons, each determining, when selected, the measuring of a different dimension of a real-world standard reference object to be measured and selectable by a user.

10. The image measuring method according to claim 1, wherein the guidance message is a guidance message in a natural language, relating to measuring the dimension selected on the first screen.

11. The image measuring method according to claim 1, wherein:

the at least two selectable icons of the first screen comprise a width icon representing the measurement of a width of the standard reference object, and a circle icon representing a circle measurement of the standard reference object, the second screen displays a preset value definition of the width measurement when the width icon is selected and a preset value definition of the circle measurement when the circle icon is selected, and the guidance message is a guidance message in a natural language providing instructions for measuring the width of the measured object when the width icon is selected and providing instructions for performing the circle measurement the measured object when the circle icon is selected.

12. The image measuring method according to claim 1, further comprising:

storing the optical-system measured value and the measurement-tool measured value in a memory;

reading out the optical-system measured value and the measurement-tool measured value from the memory, wherein operation c) subtracts the read-out measurement-tool measured value of the selected dimension of the standard reference object from the read-out optical-system measured value of the selected dimension of the standard reference object to determine a preset value and stores the preset value in the memory, storing the optical-system measured value of the dimension of the measured object in the memory; and reading out from the memory the stored optical-system measured value of the dimension of the measured object, wherein operation e) subtracts the difference between the read-out measurement-tool measured value of the selected dimension of the standard reference object and the read-out optical-system measured value of the selected dimension of the standard reference object from the read-out optical-system measured value of the dimension of the measured object.

13. The image measuring method according to claim 1, wherein
the standard reference object is a master work piece from among the plurality of measured objects,
the inputting further comprises inputting a value of the dimension of the master work piece measured by a micrometer, or a dial gauge,
the measuring further comprises measuring a value of the dimension of a measured object other than the master work piece, from among the plurality of measured objects, by the optical system, the image sensor, and the processor, and
the correcting further comprises correcting the value of the dimension of the measured object other than the master work piece, from among the plurality of measured objects, which is measured by the optical system, the image sensor, and the processor, using the preset value generated from measurements input and taken by the micrometer or the dial gauge.

14. The image measuring method according to claim 1, wherein
on the first screen,
the at least two selectable icons of the first screen comprise a width icon representing the measurement of a width of the standard reference object, and a circle icon representing a circle measurement of the standard reference object, and
the guidance message is a guidance message in a natural language, relating to measuring the dimension selected on the first screen, and
the second screen displays
two selectable icons, which, when one is selected by the user, initiates the measuring of the value of the dimension of the measured object other than the standard reference object using the optical system, the image sensor, and the processor, using a selected preset value, the two selectable icons comprising the width icon representing the measurement of the width of the standard reference object, and the circle icon representing a circle measurement of the standard reference object,
one or more selectable preset values including the calculated preset value calculated by the subtracting operation, one of which is selectable by the user for use in the correcting operation,
a measurement results window in which a plurality of measurement results are displayed, the measurement results window including
labels identifying the measured dimension measured in the second measuring operation measuring the value of the dimension of the measured object other than the standard reference object,
the error corrected in the correcting operation, and
a tolerance limit, and
a selectable icon, which, when selected by a user, instructs the display of the measurement results in the measurement results window.

15. The image measuring method according to claim 1, wherein
i) the at least two selectable icons of the first screen comprise a width icon representing the measurement of a width of the standard reference object, and a circle icon representing a circle measurement of the standard reference object,
ii) the guidance message on the second screen is a guidance message in a natural language, relating to measuring the dimension selected on the first screen,
iii) in response to selection of one of the width icon and the circle icon on the first screen, the second screen displays
a preset value definition dialog including an add icon and a confirm icon, and
preset values of different standard reference objects already registered,
iv) in response to selection of the add icon,
the displayed contents of the preset value definition dialog change to the guidance message,
the measuring of the value of the width of the standard reference object is performed with the optical system, the image sensor, and a processor in accordance with the displayed guidance when the width icon is selected, and
the measuring of the value of a circle measurement of the standard reference object is performed with the optical system, the image sensor, and a processor in accordance with the displayed guidance when the circle icon is selected,
v) after the measuring of the value of the width or the circle is completed, the second display displays a measurement window with a confirm icon,
vi) in response to selecting the confirm icon in the measurement window,
a preset value input dialog is displayed, which displays
an area for inputting and displaying the measurement-tool measured value as a standard reference value,
an area displaying the value of the measured width performed with the optical system, the image sensor, and a processor when the width icon is selected and measured, and displaying the value of the circle measurement performed with the optical system, the image sensor, and a processor when the circle measurement is selected and measured,
an area for inputting a label name identifying the preset value obtained by the subtracting operation,
an OK icon, and
a confirm icon,
vii) in response to selecting the OK icon of the preset value input dialog, calculating of the preset value for the standard reference object is initiated by performing the subtracting operation, and in response to refreshing the second screen, the preset value definition dialog displays the calculated preset value,
viii) in response to selecting the confirm icon of the preset value definition dialog, the calculated preset value is registered and stored in a registry,
ix) the first screen also displays a function window displaying a preset measurement command icon,
x) in response to selecting the preset measurement command icon, the second screen displays a preset value dialog, which displays
selectable already-registered preset values for the different standard reference objects, and including the preset value determined in the subtracting operation, and
a select icon,
xi) in response to selecting a) the already-registered preset value determined in the subtracting operation displayed in the preset value dialog, and b) the select icon,
the measuring of the value of the width of the measured object other than the standard reference object is performed using the optical system, the image sensor, and the processor when the width icon is selected, and the measuring of the value of the circle measurement of the measured object other than the standard reference object is performed using the optical system, the image sensor, and the processor when the circle icon is selected, xii) after the measuring of the value of the width or the circle measurement of the measured object other than the standard reference object is performed, the second screen displays a measurement window displaying a confirm icon, xiii) in response to selecting the confirm icon in the measurement window, the correcting operation is performed, xiv) after the correcting operation, the second screen displays
a measurement results dialog displaying an OK icon, and
a measurement results window, xv) in response to selecting the OK icon in the measurement results dialog, the measurement results window displays the corrected value of the dimension of the measured object other than the standard reference object.

16. A combination of display screen, an optical system, a processor, an X-Y-plane movable stage, a light source, an image sensor housed in a Z-direction movable casing, and a keyboard or mouse, configured to measure a dimension of a measured object supported by the X-Y-plane movable stage, illuminated from below the stage by the light source from an image of the measured object captured by the image sensor housed in the Z-direction movable casing, the combination comprising:

the X-Y-plane movable stage movable in the X and Y directions and supporting a standard reference object and the measured object;

the light source illuminating the standard reference object and the measured object, being spaced from the Z-direction movable casing, and located below the X-Y-plane movable stage;

the image sensor housed in the Z-direction movable casing movable in the Z direction, supported above the X-Y-plane movable stage, and spaced from the light source, the sensor measuring a selected dimension of the standard reference object, and the dimension of the measured object using the optical system;

the display screen configured to display
a first screen displaying at least two selectable icons representing two different dimensions of the standard reference object to be measured and selectable by a user, and
a second screen displaying a selectable icon, which, when selected, triggers the display of a guidance message relating to measuring the dimension selected on the first screen, in response to the user selecting one of the two different dimensions represented by the at least two selectable icons;

the processor,
wherein
the image sensor captures an image produced by the optical system and outputs image data, and
the processor
analyzes the output image data to measure a value of the selected dimension of the standard reference object when the standard reference object is imaged by the optical system and the image sensor to obtain an optical-system measured value of the selected dimension of the standard reference object, and after the measuring of the value of the selected dimension of the standard reference object, obtaining a measurement-tool measured value of the selected dimension of the standard reference object in response to inputting a value of the selected dimension of the standard reference object specified by a measurement tool other than the optical system, the image sensor,
subtracts the measurement-tool measured value of the selected dimension of the standard reference object from the optical-system measured value of the selected dimension of the standard reference object to determine a preset value, and
analyzes the output image data to measure a value of a dimension of the measured object when the measured object is imaged by the optical system and the image sensor to obtain an optical-system measured value of the dimension of the measured object, and the keyboard or the mouse configured to input a dimension of the standard reference object specified by the measurement tool other than the processor;

the processor measuring the selected dimension of the standard reference object in accordance with the displayed guidance message, and the processor also being configured to correct the optical-system measured value of the dimension of the measured object other than the standard reference object measured by the processor, by subtracting the preset value from the optical-system measured value of the dimension of the measured object wherein the standard reference object to be measured is determined by measuring a plurality of the measured objects with the measurement tool other than the optical system, the image sensor, and the processor, to obtain measurement-tool measured values of the plurality of the measured objects, and selecting the standard reference object to be measured based on an average of the measurement-tool measured values of the plurality of measured objects.

17. The combination according to claim 16, wherein:
the standard reference object is a master work piece, which is one among the plurality of measured objects,
the value of the dimension input via the keyboard or mouse is a value of a dimension of the master work piece measured by a micrometer, a dial gauge, or a coordinate measurement machine, and
the processor is further configured to correct, using the preset value, the value of the dimension of the measured object other than the master work piece, from among the plurality of measured objects, which is measured by the processor.

18. The combination according to claim 17, wherein the plurality of measured objects is a plurality of objects generating a similar trend of measurement errors in measured values obtained by the processor.

19. The combination according to claim 18, wherein the similar trend of measurement errors in measured values obtained by the processor occur based on at least one of a thickness of a measured object, cross-sectional shape, and optical characteristics of a material.

20. The combination according to claim 16, wherein:
the standard reference object is a master work piece, which is one among the plurality of measured objects,
the value of the dimension input via the keyboard or mouse is a value of a dimension of the master work piece measured by a micrometer, a dial gauge, or a coordinate measurement machine, and the processor is further configured to correct, using the preset value, the value of the dimension of the measured object other than the master work piece, from among the plurality of measured objects, which is measured by the processor.

21. The combination according to claim 20, wherein the plurality of measured objects is a plurality of objects generating a similar trend of measurement errors in measured values obtained by the processor.

22. The combination according to claim 21, wherein the similar trend of measurement errors in measured values obtained by the processor occur based on at least one of a thickness of a measured object, cross-sectional shape, and optical characteristics of a material.

23. An image measuring method for measuring a dimension of a measured object supported by an X-Y-plane movable stage, illuminated from below the stage with a light source, and imaged with an optical system and an image sensor housed in a Z-direction movable casing, a processor measuring the dimension of the measured object from an image of the measured object captured by the image sensor, the method comprising:

measuring a value of a dimension of a standard reference object with the optical system, the image sensor, and the processor measuring the dimension of the measured object from the image of the measured object captured by the image sensor to obtain an optical-system measured value of the selected dimension of the standard reference object;

after the measuring operation inputting a value of the dimension of the standard reference object specified by a measurement tool other than the optical system, the image sensor, and the processor measuring the dimension of the measured object from the image of the measured object captured by the image sensor to obtain a measurement-tool measured value of the selected dimension of the standard reference object;

displaying a first screen on a display used with the optical system, the image sensor, and the processor measuring the dimension of the measured object from the image of the measured object captured by the image sensor, after performing the measuring operation, the first screen displaying a value of the measured dimension, a value of the input dimension, and a selectable icon, which, when selected by a user, instructs the optical system, the image sensor, and the processor measuring the dimension of the measured object from the image of the measured object captured by the image sensor to calculate a preset value by subtracting the measurement-tool measured value of the selected dimension of the standard reference object from the optical-system measured value of the selected dimension of the standard reference object;

calculating, in response to selecting of the selectable icon, the preset value by subtracting the measurement-tool measured value of the selected dimension of the standard reference object from the optical-system measured value of the selected dimension of the standard reference object;

displaying a second screen on the display used with the optical system, the image sensor, and the processor measuring the dimension of the measured object from the image of the measured object captured by the image sensor, after the preset value is calculated, the second screen displaying the preset value, and a selectable icon, which when selected by the user, registers the preset value and stores the preset value in a memory used by the processor measuring the dimension of the measured object from the image of the measured object captured by the image sensor;

measuring a value of a dimension of a measured object other than the standard reference object, using the optical system, the image sensor, and the processor measuring the dimension of the measured object from the image of the measured object captured by the image sensor to obtain an optical-system measured value of the dimension of the measured object;

correcting the optical-system measured value of the dimension of the measured object other than the standard reference object measured by the optical system, the image sensor, and the processor measuring the dimension of the measured object from the image of the measured object captured by the image sensor, by subtracting the preset value from the optical-system measured value of the dimension of the measured object;

supporting the standard reference object and the measured object on the X-Y-plane movable stage movable in the X and Y directions;

illuminating the standard reference object and the measured object with the light source spaced from the Z-direction movable casing and located below the X-Y-plane movable stage; and measuring a selected dimension of the standard reference object, and the dimension of the measured object using the optical system and the sensor housed in the Z-direction movable casing movable in the Z direction, supported above the movable stage, and spaced from the light source, wherein the standard reference object to be measured is determined by measuring a plurality of the measured objects with the measurement tool other than the optical system, the image sensor, and the processor, to obtain measurement-tool measured values of the plurality of the measured objects, and selecting the standard reference object to be measured based on an average of the measurement-tool measured values of the plurality of measured objects.

24. The image measuring method of claim 23, wherein the light source comprises a visible light source for imaging on the image sensor, and the image sensor is a visible-light image sensor, the measuring of the dimension of the standard reference object comprises measuring a dimension of a standard reference object with the optical system, the image sensor, and the processor using visible light, and the visible-light image sensor measuring the dimension of the measured object from the image of the measured object captured by the image sensor, and the inputting comprising inputting the dimension of the standard reference object specified by a measurement tool comprising only a mechanical measurement tool other than the optical system, the image sensor, and the processor measuring the dimension of the measured object from the image of the measured object captured by the image sensor.

25. An image measuring method for measuring a dimension of a measured object supported by a X-Y-plane movable stage, illuminated from below the stage with a light source, and imaged with an optical system, and an image sensor housed in a Z-direction movable casing, a processor measuring the dimension of the measured object from an image of the measured object captured by the image sensor, the method comprising:

measuring in a first measuring operation a value of a dimension of a standard reference object with the optical system, the image sensor, and the processor measuring the dimension of the measured object from the image of the measured object captured by the image sensor to obtain an optical-system measured value of the selected dimension of the standard reference object;

after the first measuring operation, inputting a value of the dimension of the standard reference object specified by a measurement tool other than the optical system, the image sensor, and the processor measuring the dimension of the measured object from the image of the measured object captured by the image sensor to obtain a measurement-tool measured value of the selected dimension of the standard reference object;

calculating a preset value by subtracting the measurement-tool measured value of the selected dimension of the standard reference object from the optical-system measured value of the selected dimension of the standard reference object;

displaying a first screen on a display used with the optical system, the image sensor, and the processor measuring the dimension of the measured object from the image of the measured object captured by the image sensor, after performing the calculating operation, the first screen displaying a selectable preset measurement command icon, which, when selected by a user, instructs displaying of a second screen on the display permitting selection of a preset value;

displaying the second screen on the display in response to selection of the selectable icon on the first screen, the second screen displaying one or more selectable preset values including the calculated preset value, one of which is selectable by the user for use in a correcting operation correcting a dimension of an object other than the standard reference object measured using the optical system, the image sensor, and the processor measuring the dimension of the measured object from the image of the measured object captured by the image sensor, and a selectable icon, which, when selected by the user, initiates a second measuring operation to measure a value of a dimension of the object other than the standard reference object to obtain an optical-system measured value of the dimension of the measured object, selecting one of the selectable preset values on the second screen for correcting the measured dimension of the object other than the standard reference object;

performing the second measuring operation after the selecting of the selectable icon on the second screen;

correcting the optical-system measured value of the dimension of the measured object other than the standard reference object measured by the optical system, the image sensor, and the processor measuring the dimension of the measured object from the image of the measured object captured by the image sensor, by subtracting the preset value from the optical-system measured value of the dimension of the measured object;

supporting the standard reference object and the measured object on the X-Y-plane movable stage movable in the X and Y directions;

illuminating the standard reference object and the measured object with the light source spaced from the Z-direction movable casing and located below the X-Y-plane movable stage; and measuring a selected dimension of the standard reference object, and the dimension of the measured object using the optical system and the sensor housed in the Z-direction movable casing movable in the Z direction, supported above the movable stage, and spaced from the light source, wherein the standard reference object to be measured is determined by measuring a plurality of the measured objects with the measurement tool other than the optical system, the image sensor, and the processor, to obtain measurement-tool measured values of the plurality of the measured objects, and selecting the standard reference object to be measured based on an average of the measurement-tool measured values of the plurality of measured objects.

26. The image measuring method of claim 25, wherein the one or more selectable preset values displayed on the second screen represent the difference between the dimension of the standard reference object measured by the optical system, the image sensor, and the processor, and the dimension of the standard reference object specified by the measurement tool other than the optical system, the image sensor, and the processor, and the one or more selectable preset values including the calculated preset value, one of which is selectable by the user for use in a correcting operation correcting a dimension of an object other than the standard reference object measured using the optical system, the image sensor, and the processor measuring the dimension of the measured object from the image of the measured object captured by the image sensor.

27. The image measuring method of claim 25, wherein the correcting operation corrects a dimension of an object other than the standard reference object measured using the optical system, the image sensor, and the second screen displays two selectable icons, which, when one is selected by the user, initiates the second measuring operation using a selected preset value, the two selectable icons comprising a width icon representing the measurement of a width of the standard reference object, and a circle icon representing a circle measurement of the standard reference object.

28. The image measuring method of claim 25, wherein the selectable icon displayed on the second screen is a real-world-object-measurement selectable icon, which, when selected by the user, initiates a second measuring operation using the a selected preset value, measuring of a dimension of a real-world standard reference object to be measured.

29. An image measuring method for measuring a dimension of a measured object supported by a X-Y-plan-movable stage, illuminated from below the stage with a light source, and imaged with an optical system, and an image sensor housed in a Z-direction movable casing, a processor measuring the dimension of the measured object from an image of the measured object captured by the image sensor, the method comprising:

measuring in a first measuring operation a value of a dimension of a standard reference object with the optical system, the image sensor, and the processor measuring the dimension of the measured object from the image of the measured obj ect captured by the image sensor to obtain an optical-system measured value of the dimension of the standard reference object;

after the measuring operation inputting a value of the dimension of the standard reference object specified by a measurement tool other than the optical system, the image sensor, and the processor measuring the dimension of the measured object from the image of the measured object captured by the image sensor to obtain a measurement-tool measured value of the selected dimension of the standard reference object;

calculating a preset value by subtracting the measurement-tool measured value of the selected dimension of the standard reference object from the optical-system measured value of the selected dimension of the standard reference object;

measuring in a second measuring operation a value of a dimension of a measured object other than the standard reference object using the optical system, the image sensor, and the processor measuring the dimension of the measured object from the image of the measured object captured by the image sensor to obtain an optical-system measured value of the dimension of the measured object;

displaying, after performing of the second measuring operation, a first screen on a display used with the optical system, the image sensor, and the processor measuring the dimension of the measured object from the image of the measured object captured by the image sensor, the first screen displaying a selectable icon, which, when selected by the user, initiates a correcting operation correcting the dimension of the measured object other than the standard reference object measured by the optical system, the image sensor, and the processor measuring the dimension of the measured object from the image of the measured object captured by the image sensor, using the calculated preset value;

correcting the optical-system measured value of the dimension of the measured object other than the standard reference object measured by the optical system, the image sensor, and the processor measuring the dimension of the measured object from the image of the measured object captured by the image sensor, by subtracting the preset value from the optical-system measured value of the dimension of the measured object; and displaying on the display, after the correcting operation, a second screen that displays a measurement results window in which a plurality of measurement results are displayed, the measurement results window including labels identifying the measured dimension measured in the second measuring operation, the error corrected in the correcting operation, and a tolerance limit, and a selectable icon, which, when selected by a user, instructs the display of the measurement results in the measurement results window supporting the standard reference object and the measured object on the X-Y-plane movable stage movable in the X and Y directions;

illuminating the standard reference object and the measured object with the light source spaced from the Z-direction movable casing and located below the X-Y-plane movable stage; and measuring a selected dimension of the standard reference object, and the dimension of the measured object using the optical system and the sensor housed in the Z-direction movable casing movable in the Z direction, supported above the movable stage, and spaced from the light source, wherein the standard reference object to be measured is determined by measuring a plurality of the measured objects with the measurement tool other than the optical system, the image sensor, and the processor, to obtain measurement-tool measured values of the plurality of the measured objects, and selecting the standard reference object to be measured based on an average of the measurement-tool measured values of the plurality of measured objects.

30. The image measuring method of claim 29, wherein the light source comprises a visible light source for imaging on the image sensor, and the image sensor is a visible-light image sensor, the measuring in the first measuring operation measures the dimension of the standard reference object with the optical system, the image sensor, and the processor measuring the dimension of the measured object from the image of the measured object captured by the image sensor, the inputting of the dimension of the standard reference object is specified by a measurement tool comprising only a mechanical measurement tool other than the optical system, the image sensor, and the processor measuring the dimension of the measured object from the image of the measured object captured by the image sensor, the measurement results window of the second screen displays a plurality of measurement results of the dimension of the measured object other than the standard reference object obtained with visible light and the visible-light image sensor, and labels identifying the measured dimension of the measured object other than the standard reference object obtained with visible light and the visible-light image sensor measured in the second measuring operation.

* * * * *

UNITED STATES PATENT AND TRADEMARK OFFICE
CERTIFICATE OF CORRECTION

PATENT NO. : 11,257,205 B2
APPLICATION NO. : 15/384713
DATED : February 22, 2022
INVENTOR(S) : G. Cho et al.

Page 1 of 1

It is certified that error appears in the above-identified patent and that said Letters Patent is hereby corrected as shown below:

In the Claims

Column 12, Line 43 (Claim 11, Line 16) please change "measurement the" to -- measurement of the --

Column 20, Line 55 (Claim 28, Line 5) please change "the a selected" to -- the selected --

Column 20, Line 59 (Claim 29, Line 2) please change "X-Y-plan-movable" to -- X-Y-plane movable --

Column 21, Line 3 (Claim 29, Line 13)) please change "obj ect" to -- object --

Signed and Sealed this
Twenty-sixth Day of July, 2022

Katherine Kelly Vidal
*Director of the United States Patent and Trademark Office*